United States Patent [19]

Oleskow et al.

[11] Patent Number: 5,236,578

[45] Date of Patent: Aug. 17, 1993

[54] FILTER LIFE INDICATOR FOR WATER PURIFICATION SYSTEM USING MAGNETICALLY ACTUATED SWITCH

[75] Inventors: Brett J. Oleskow, Elgin; Evan P. Browne, Fox River Grove; James D. Meyer, Hanover Park, all of Ill.

[73] Assignee: American Home Water Products Corporation, Lake Zurich, Ill.

[21] Appl. No.: 909,608

[22] Filed: Jul. 7, 1992

[51] Int. Cl.[5] .................................. G01F 1/60
[52] U.S. Cl. ........................ 210/87; 73/861;
    73/861.08; 200/81.9 M; 210/138; 340/609
[58] Field of Search .............. 210/85, 87, 88, 89,
    210/138, 143, 192, 259; 340/606, 609, 611,
    825.65; 73/861.63, 861.08; 200/81.9 M, 82 E

[56] References Cited

U.S. PATENT DOCUMENTS

| | | | |
|---|---|---|---|
| 4,522,077 | 6/1985 | Koberle | 73/861.63 |
| 4,623,451 | 11/1986 | Oliver | 210/87 |
| 4,808,994 | 2/1989 | Riley | 340/825.65 |
| 4,918,426 | 4/1990 | Butts et al. | 340/611 |
| 5,055,641 | 10/1991 | Richards | 200/81.9 M |
| 5,089,144 | 2/1992 | Ozkahyadglu et al. | 210/87 |

FOREIGN PATENT DOCUMENTS

| | | | |
|---|---|---|---|
| 3107716 | 5/1988 | Japan | 210/87 |
| 2219662 | 12/1989 | United Kingdom | 73/861.08 |
| 91/00986 | 1/1991 | World Int. Prop. O. | 73/861.08 |

Primary Examiner—Joseph W. Drodge
Attorney, Agent, or Firm—Douglas B. White

[57] ABSTRACT

A filter life indicator is described herein utilizing a constant flow channel and a flow actuated switch incorporating a reciprocating magnetic member to start a timer. Circuitry monitors this timer and actuates a visual or audible indicator when the filter needs to be replaced. The timer consists of a pulse generator, a scaling circuit, a counter, and a comparator. During flow pulses are counted and compared to a preset limit. And to accommodate filters having differing life expectancy, modules corresponding to each filter are installed to change the scaling circuit.

4 Claims, 2 Drawing Sheets

FILTER LIFE INDICATOR FOR WATER PURIFICATION SYSTEM USING MAGNETICALLY ACTUATED SWITCH

BACKGROUND OF THE INVENTION

1. Field of the Invention

The present invention relates generally to water purification systems for home use and more particularly to an apparatus for measuring the life of a filter used in such a system.

2. Description of the Prior Art

Water purification systems designed for purifying and dispensing water in the home typically use replaceable filters, with their useful life depending on usage. Methods to determine this life are exemplified by U.S. Pat. No. 4,623,451 in which an electronic timer is employed to monitor the flow, and a faucet actuated switch is used to control the timer.

SUMMARY OF THE INVENTION

It is a principal object of the present invention to provide an improved and more reliable system for measuring the life of a filter which easily accommodates filters of differing life expectancy.

A filter life indicator is described herein utilizing a flow actuated switch to start a timer. Circuitry monitors this timer and actuates a visual or audible indicator when the filter needs to be replaced. Additionally, the timer incorporates a replaceable module which sets a maximum life for the filter; and to accommodate filters having differing life expectancy, a module corresponding to each filter is installed along with the filter.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Figure 1:
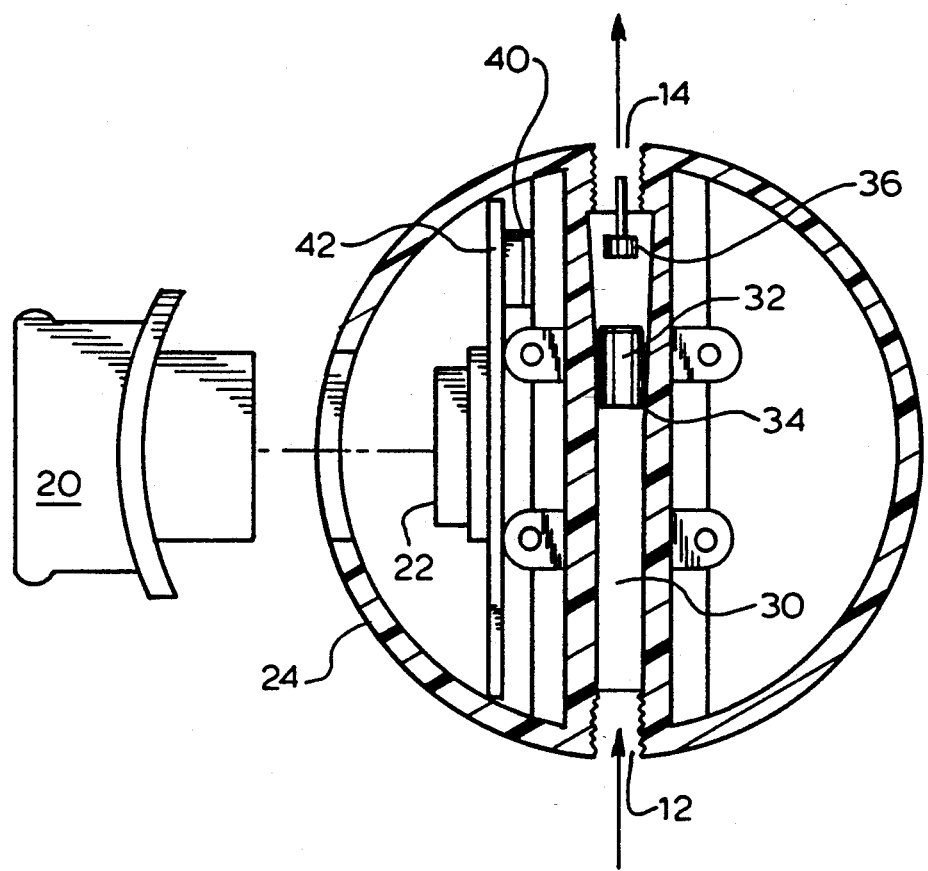
FIG. 1 is a sectional view of the indicator device showing the flow actuated valve and replaceable timer module of the present invention.

Turning first to FIG. 1 there is shown the filter life indicator of the present invention for connection into a water line of a purification system at inlet 12 and outlet 14. A timer module 20, selected according to the life of the filter, plugs into a circuit connector 22 within the housing 24; and this module is replaced each time the filter for the system is replaced.

Controlled flow is obtained through channel 30, and to detect the flow there is provided an actuating magnet 32 mounted for free reciprocal movement between the channel constriction 34 and the repelling magnet 36 at the outflowing orifice 14. When flow is initiated, by operation of a faucet or otherwise, the actuating magnet shifts toward the repelling magnet, with the water flowing around the magnets. When flow stops, the actuating magnet moves away from the repelling magnet. This movement of the actuating magnet operates a magnetically responsive reed switch 40 mounted to the circuit board 42 proximate the flow channel 30. The circuitry of the present invention uses this magnetically induced reed switch operation to start and stop the timing circuitry.

Figure 2:
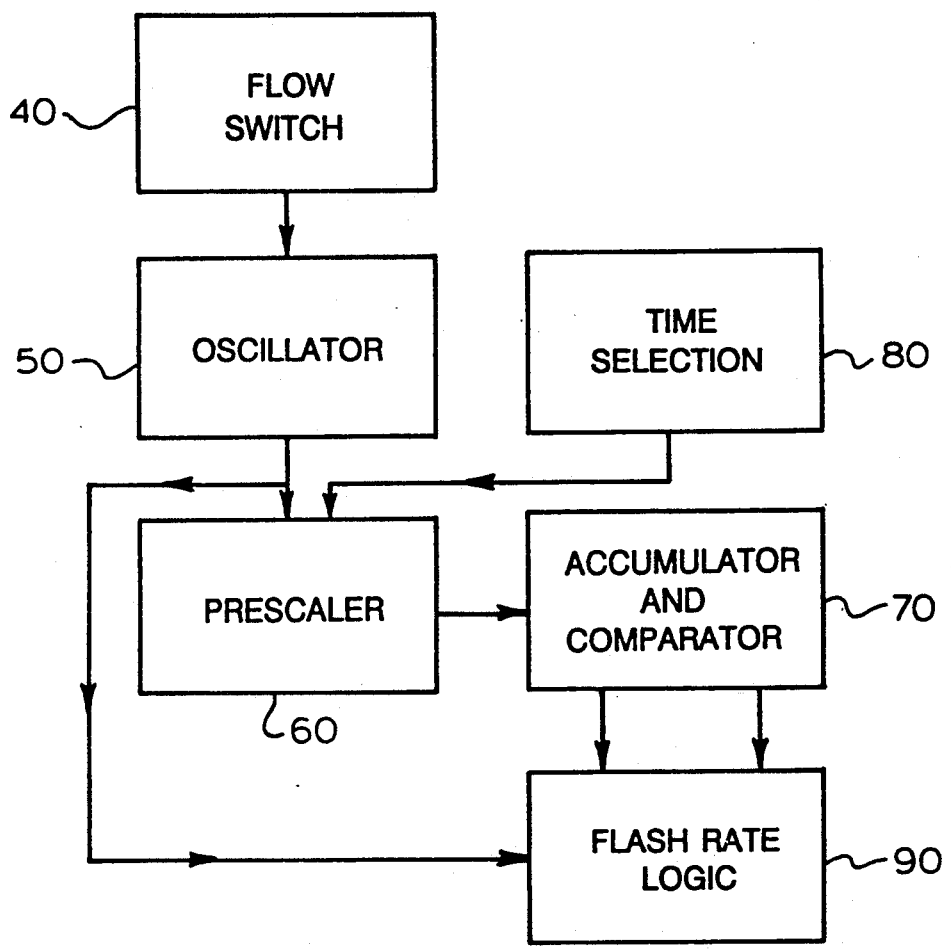
FIG. 2 is a block diagram of the electronic circuitry of the device of FIG. 1.

Turning now to FIG. 2, the reed switch 40 (flow switch) is connected to start and stop an oscillator 50 mounted on the circuit board. The oscillator pulses are fed to a scaling circuit 60 (prescaler) and from there to an accumulator and comparator 70. In the preferred embodiment the prescaler consists of a commercially available "divide by N circuit", where the division N is set by selective terminal connections. The accumulator and comparator circuit includes a counter to count the pulses received from the scaling circuit which the comparator compares against a preset maximum. The desired time selection is made with a replaceable module 80 (time selection) containing predetermined jumper connections to a common line to determine the "N" in the "divide-by-N" scaling circuit. This effectively scales the count of oscillator pulses to the counter and is easily changed to correspond to filters of differing life expectancies.

Solid state logic 90 is used to flash a visual or audible signal whenever the system is in use and to respond to the output of the accumulator/comparator circuitry to indicate the status (OK or Replace) for the filter.

From the foregoing description, it will be apparent that modifications can be made to the apparatus and method for using same without departing from the teachings of the present invention. Accordingly, the scope of the invention is only to be liminted as necessitated by the accompanying claims.

We claim:

1. In a water filtering system connected to a water line having means to selectively control the flow of water through a defined channel of flow, the improvement comprising:

switch means actuated by said flow for detecting said flow, said switch means comprising a magnetic member restrained in the channel of flow for reciprocal motion responsive to said flow and a magnetically operated switch positioned proximate said magnetic member for actuation thereby, wherein said magnetic member is constrained for reciprocal motion within said channel of flow; and circuit means coupled to said switch means for timing the duration of said water flow and providing an indicator signal when a predetermined amount of flow has occurred, said circuit means including pulse generation means, counter means coupled to said pulse generation means for accumulating the count of generated pulses in response to activation by said switch, and comparator means for comparing said count against a predetermined maximum count, wherein said counter means includes "divide by N" circuitry and a separably replaceable module means for selecting the "N" factor and for selectively scaling said generated pulses.

2. The water filtering system of claim 1 wherein said replaceable module means comprises predetermined jumper connections.

3. In a water filtering system connected to a water line having means to selectively control the flow of water through a defined channel of flow, the improvement comprising:

switch means actuated by said flow for detecting said flow, said switch means comprising a magnetic member restrained in the channel of flow for reciprocal motion responsive to said flow and a magnetically operated switch positioned proximate said magnetic member for actuation thereby, wherein said magnetic member is constrained between a constriction in said channel of flow and a fixed repelling magnet positioned within said channel of flow; and circuit means coupled to said switch means for timing the duration of said water flow and providing an indicator signal when a predetermined amount of flow has occurred, said circuit means including pulse generation means, counter means coupled to said pulse generation means for accumulating the count of generated pulses in response to activation by said switch, and comparator means for comparing said count against a predetermined maximum count.

4. The water filtering system of claim 3 wherein said counter means includes "divide by N" circuitry and a replaceable module for selecting the "N" factor, for selectively scaling said generated pulses.

* * * * *